(12) United States Patent
Zaghloul et al.

(10) Patent No.: US 8,331,002 B2
(45) Date of Patent: Dec. 11, 2012

(54) PASSIVE ALL OPTICAL POLARIZATION SWITCH AND LOGIC DEVICES UTILIZING THE SAME

(76) Inventors: Yasser A. Zaghloul, Atlanta, GA (US); Arm Zaghloul, Lincoln, NE (US)

( * ) Notice: Subject to any disclaimer, the term of this patent is extended or adjusted under 35 U.S.C. 154(b) by 838 days.

(21) Appl. No.: 12/359,945

(22) Filed: Jan. 26, 2009

(65) Prior Publication Data

US 2009/0190196 A1     Jul. 30, 2009

Related U.S. Application Data

(60) Provisional application No. 61/023,846, filed on Jan. 26, 2008.

(51) Int. Cl.
  *G06E 3/00* (2006.01)
  *G02F 3/00* (2006.01)
  *G02B 5/30* (2006.01)
(52) U.S. Cl. .................... 359/107; 359/108; 359/485.01
(58) Field of Classification Search .................. 359/107, 359/485.02
See application file for complete search history.

(56) References Cited

U.S. PATENT DOCUMENTS 8,004,734 B2 * 8/2011 Zaghloul et al. .............. 359/108
2005/0053329 A1 * 3/2005 Shahar ........................... 385/27

* cited by examiner

*Primary Examiner* — Jade R Chwasz
(74) *Attorney, Agent, or Firm* — Charlena Thorpe, Esq.; The Law Office of Charlena Thorpe, Inc.

(57) ABSTRACT

A passive all optical polarization switch and apparatus and methods for implementing logical operations using the switch is provided. The switch converts a first polarized beam having a polarization angle equals to or nearly equals to ±45 degrees into a beam equal to or nearly equal to the vertical component of the first polarized beam. The switch converts a second polarized beam having a polarization angle equals to or nearly equals to ±45 degrees into a beam equal to or nearly equal to the horizontal component of the second polarized beam. The switch combines the vertical component of the first polarized beam and the horizontal component of the second polarized beam to produce an output polarized beam. The switch is used to implement all optical polarization logic gates.

1 Claim, 7 Drawing Sheets

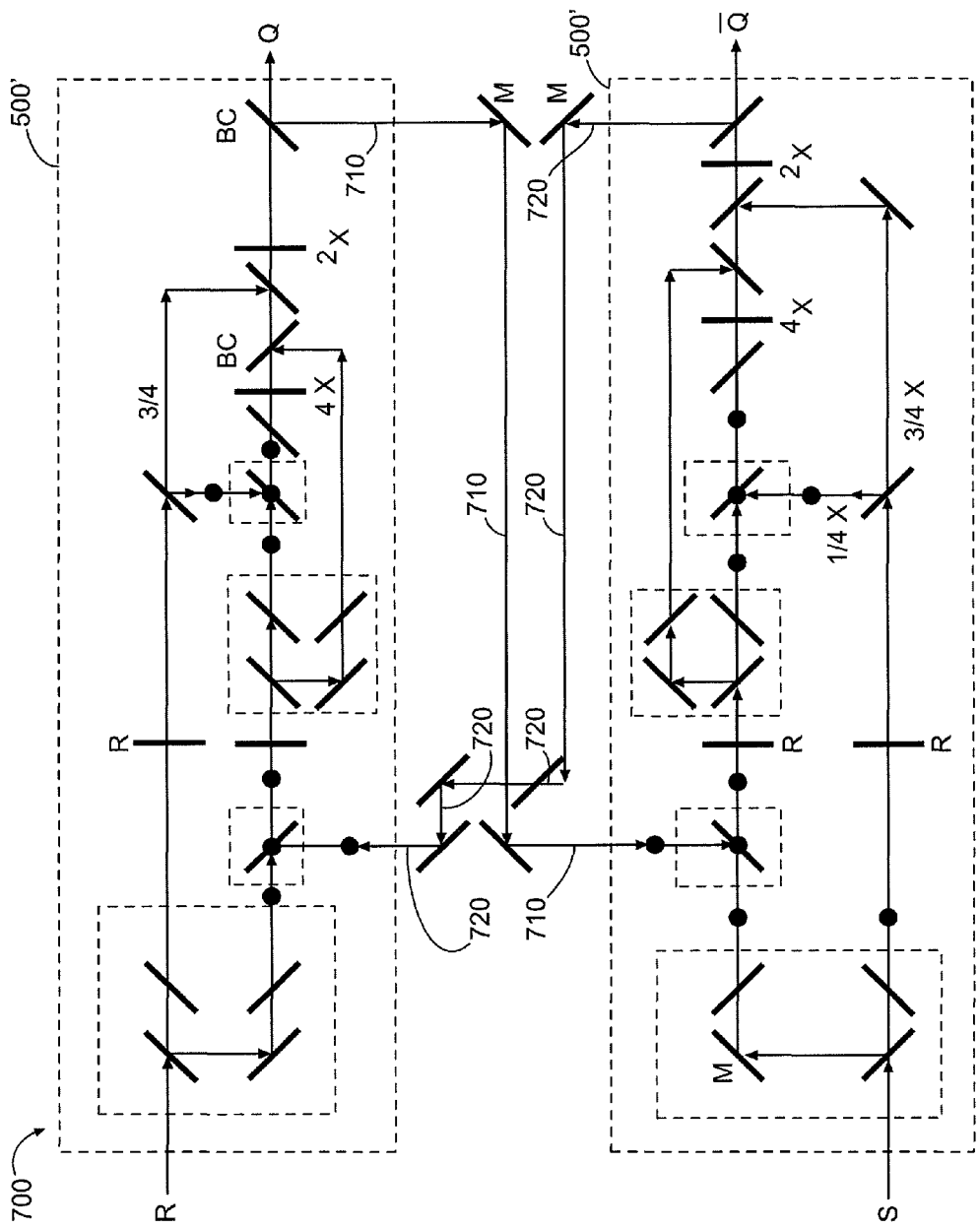
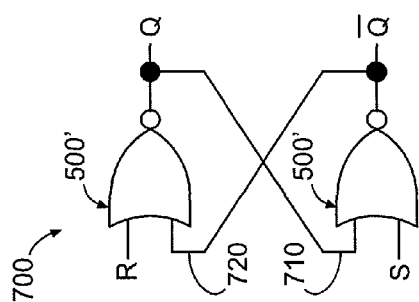
FIG. 7b
FIG. 7a

PASSIVE ALL OPTICAL POLARIZATION SWITCH AND LOGIC DEVICES UTILIZING THE SAME

CROSS REFERENCE TO RELATED APPLICATION

This application claims priority to U.S. Provisional Application No. 61/023, 846, filed on Jan. 26, 2008, which is incorporated herein by reference.

FIELD OF THE INVENTION

Embodiments of the present invention relate to a passive all optical polarization switch and logic devices utilizing the passive all optical polarization switch.

BACKGROUND OF THE INVENTION

U.S. patent application Ser. No. 11/804,595 filed on May 18, 2007, which is incorporated by reference, introduces a method of representing the binary logic state of a beam based on the polarization angle of the beam. U.S. patent application Ser. No. 11/804,595 further discloses optical gates that utilize the polarization based logic level representation of the input beams to perform logical operations. The optical gates disclosed in U.S. patent application Ser. No. 11/804,595 use an electro-optic switch to implement the gates. There is a need for an all optical polarization switch to design all optical gates for reduced power consumption and higher speed.

SUMMARY OF THE INVENTION

Apparatus and methods for implementing logical operations using an all optical passive polarization switch is provided. In one embodiment, there is provided an apparatus and method for implementing a passive all optical polarization switch. A methods and apparatus produce an output polarized beam based on the polarization angle of a first input polarized beam having a polarization angle equals to or nearly equal to 45 degrees or −45 degrees and, if present, the polarization angle of a second input polarized beam having a polarization angle equals to or nearly equal to 45 degrees or −45 degrees. More specifically, when the second input polarized beam is present, the polarization angle of the output polarized beam equals or nearly equals the polarization angle of the first input polarized beam and, when the second input polarized beam is not present, the polarization angle of the output polarized beam either equals or nearly equals 90 degrees when the polarization angle of the first input polarized beam equals or nearly equals 45 degrees or equals or nearly equals −90 degrees when the polarization angle of the first input polarized beam equals or nearly equals −45 degrees.

In another embodiment, there is provided a method and apparatus that polarizes a first polarized beam at a first polarization angle equal to or nearly equal to ±90 degrees. The polarization angle of the first polarized beam equals or nearly equals 45 degrees or −45 degrees. A second polarized beam is polarized at a second polarization angle equal to or nearly equal to 0 degrees. The polarization angle of the second polarized beam equals or nearly equals 45 degrees or −45 degrees. The resulting from the first and second polarizing steps are combined to produce an output polarized beam.

In another embodiment, there is provided a method and apparatus that converts a first polarized beam having a polarization angle equals to or nearly equals to 45 degrees or −45 degrees into a beam equal to or nearly equal to the vertical component of the first polarized beam. A second polarized beam having a polarization angle equals to or nearly equals to 45 degrees or −45 degrees is converted into a beam equal to or nearly equal to the horizontal component of the second polarized beam. The vertical component of the first polarized beam and the horizontal component of the second polarized beam are combined to produce an output polarized beam.

In another embodiment, there is provided methods and apparatuses for passing or blocking an input beam having a first polarization angle based on a control beam having a second polarization angle.

In another embodiment, there is provided methods and apparatuses for converting an input beam into a beam representing one of two binary logic states wherein a first logic state is represented by a beam having a first polarization angle and a second logic state is represented by a beam having a second polarization angle and the input beam has a third polarization angle.

Advantages of the invention will be set forth in part in the description which follows, and in part will be obvious from the description, or may be learned by practice of the invention. The advantages of the invention will be realized and attained by means of the elements and combinations particularly pointed out in the appended claims.

Both the foregoing general description and the following detailed description are exemplary and explanatory only and are not restrictive of the invention, as claimed.

BRIEF DESCRIPTION OF THE DRAWINGS

FIG. 7a illustrates an SR latch.

FIG. 7b illustrates an embodiment of an SR latch utilizing an all optical passive polarization switch.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1A:
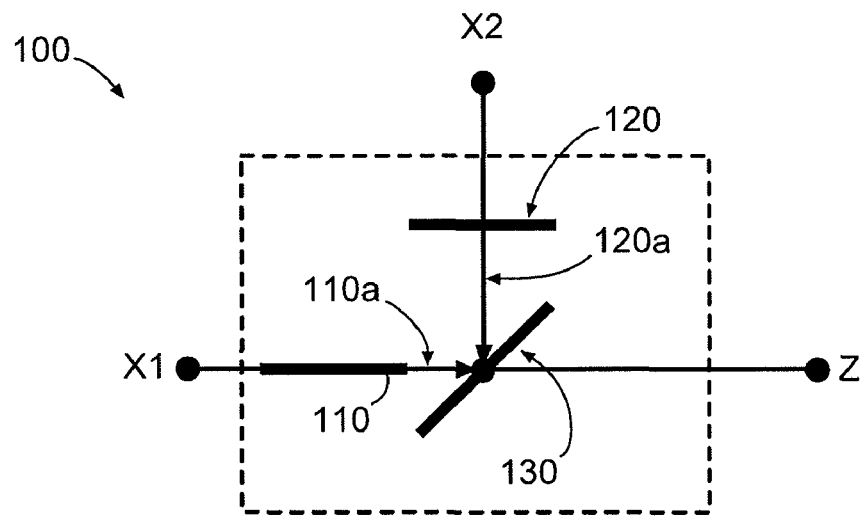
FIG. 1a illustrates an embodiment of an all optical passive polarization switch.

FIG. 1 illustrates an embodiment of a passive all-optical polarization switch 100 based on the principles of the present invention. Switch 100 may consist of a polarizer 110 having a polarization angle of 0° (i.e., a horizontal polarizer), a polarizer 120 having a polarization angle of ±90° (i.e., a vertical polarizer), and a beam splitter acting as a beam collector 130. Optical beams X1 and X2 are inputs to switch 100 and beam Z is an output. X1 and X2 may be linearly polarized light at 45° representing L1 or linearly polarized light at –45° representing L0. X1 may be processed by polarizer 110 to produce beam 110a. X2 may be processed by polarizer 120 to produce beam 120a. Beams 110a and 120a may be processed by beam collector 130 to produce output beam Z.

If input beam X1=L0 (i.e., polarized at –45°), polarizer 110 will produce a beam 110a equal to the horizontal component of X1. Thus, beam 110a will have a polarization of 0°. Similarly, if input beam X1=L1 (i.e., polarized at 45°), beam 110a will have a polarization of 0°. Accordingly, if input beam X1 is present at the input of switch 100, beam 110a will always have a polarization of 0°.

If input beam X2=L0, polarizer 120 will produce a beam 120a equal to the vertical component of X2. Thus, beam 120a will have a polarization of –90°. Similarly, if input beam X2=L1, beam 120a will have a polarization of +90°.

Table 1 indicates the polarization state of output beam Z for the various combinations of X1 and X2 when input beams X1 and X2 are present at the inputs of switch 100.

TABLE 1

| X1 | X2 | Z |
|----|----|----|
| L0 | L0 | L0 |
| L0 | L1 | L1 |
| L1 | L0 | L0 |
| L1 | L1 | L1 |

As shown in Table 1, when X1=L0 and X2=L0, BC 130 combines the horizontal component of X1 (i.e., a beam having a polarization angle 0°) and the vertical component of X2 (i.e., a beam having a polarization angle of –90°) to produce an output beam Z having a polarization angle of –45°, which represents L0.

When X1=L0 and X2=L1, BC 130 combines the horizontal component of X1 (i.e., a beam having a polarization angle 0°) and the vertical component of X2 (i.e., a beam having a polarization angle of 90°) to produce an output beam Z having a polarization angle of 45°, which represents L1.

When X1=L1 and X2=L0, BC 130 combines the horizontal component of X1 (i.e., a beam having a polarization angle 0°) and the vertical component of X2 (i.e., a beam having a polarization angle of –90°) to produce an output beam Z having a polarization angle of –45°, which represents L0.

When X1=L1 and X2=L1, BC 130 combines the horizontal component of X1 (i.e., a beam having a polarization angle 0°) and the vertical component of X2 (i.e., a beam having a polarization angle of 90°) to produce an output beam Z having a polarization angle of 45°, which represents L1.

If X1 is not present at the input of switch 100, the output beam Z will equal the vertical component of X2. Thus, when X2=L0, BC 130 will produce a beam having a polarization of –90°. Similarly, when X2=L1, BC 130 will produce a beam having a polarization of +90°.

Likewise, if X2 is not present at the input of switch 100, the output beam Z will equal the horizontal component of X1. Thus, when X1=L0 or L1, BC 130 will produce a beam having a polarization of 0°.

In a system in which L1 and L0 are represented by linearly polarized light at 45° and –45°, respectively, a beam having a polarization of 0° or ±90° does not represent any logic state. Nevertheless, as shown below, switch 100 may be used to implement logical gates.

Figure 1B:
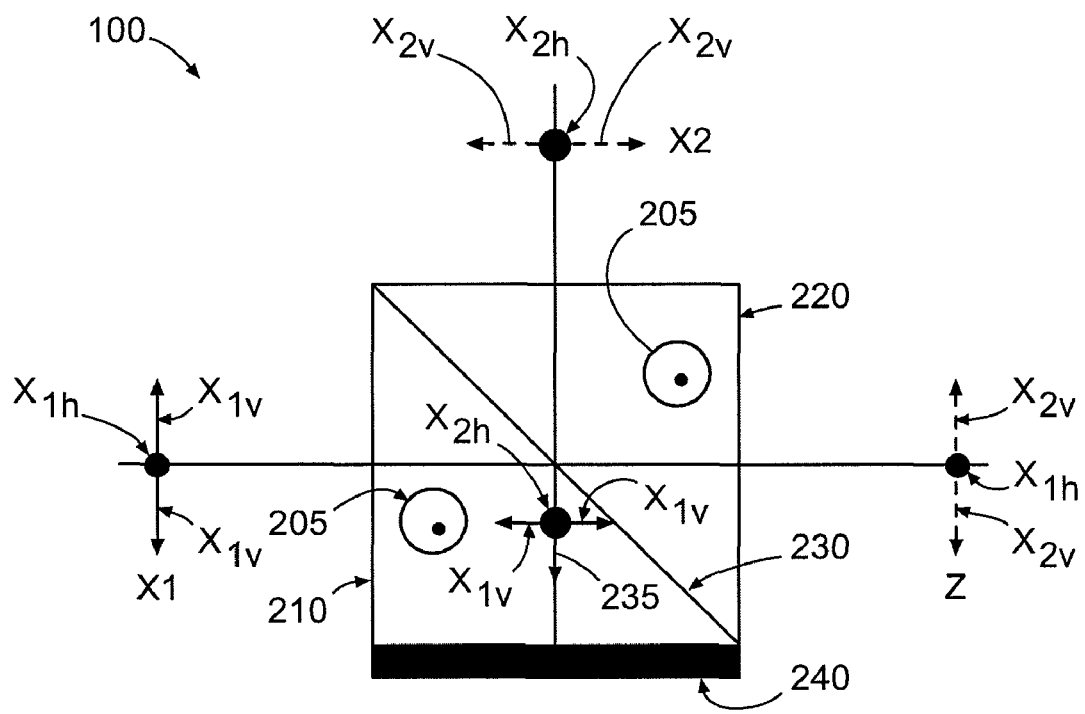
FIG. 1b illustrates another embodiment of an all optical passive polarization switch.

FIG. 1b illustrates another embodiment of a passive all optical polarization switch 100 based on the principles of the present invention. Switch 100 may consist of a polarizing beam splitter (PBS) such as birefringent polarizer (BP) of the Glan-Thompson type or of the Glan-Foucault (sometimes called Glan-Air) type, with or without a Taylor modification. The BP switch 100 may consist of two prisms 210, 220 where the optic axes 205 of the two prisms 210, 220 are parallel to each other and perpendicular to the page. The two input beams X1 and X2 are decomposed into two components— one parallel to the optic axis 205, i.e., the horizontal-polarization (HP) component X1h, X2h, respectively, and the other perpendicular to the optic axis 205, i.e., the vertical-polarization (VP) component, X1v, X2v, respectively. The HP component of each of the two input beams (i.e., X1h, X2h) may be completely transmitted though prisms 210, 220, respective, unchanged. Accordingly, the HP component of X1, i.e., X1h, appears at the output Z and the HP component of X2, i.e., X2h, appears at the border having the absorbing paint or anti-reflection coating 240. The VP component of each of the two optical signals (i.e., X1v, X2v) may be completely reflected at the diagonal 230 of BP switch 100. Accordingly, the VP component of X2, i.e., X2v, appears at the output Z and the VP component of X1, i.e., X1v, appears at the border having the absorbing paint or anti-reflection coating 240. Thus, the output beam Z is composed of the HP component of the X1, i.e., X1h, and the VP component of the X, i.e., X2V. The absorbing paint or anti-reflection coating 240 absorbs the HP component of X2, i.e., X2h, and the VP component of X1, i.e., X1v.

Figure 2:
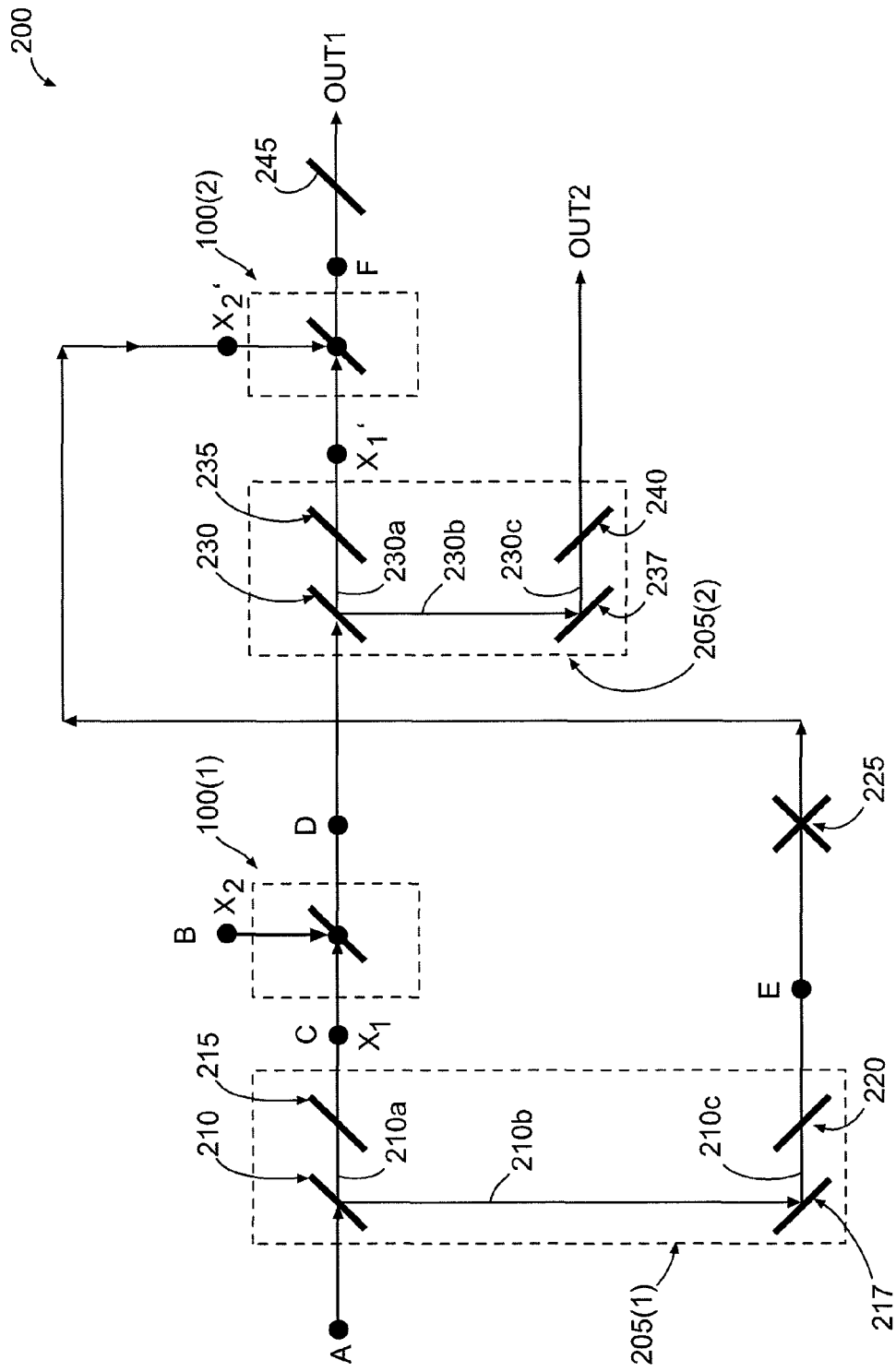
FIG. 2 illustrates an embodiment of an AND gate implementation utilizing an all optical passive polarization switch.

FIG. 2 illustrates an embodiment of an AND gate 200 based on the principles of the present invention. Optical beams A and B may be inputs to AND gate 200 and the output of AND gate 200 is either OUT1 or OUT2, whichever signal is present. More specifically, the output is a beam that may be obtained by using a beam splitter as a beam collector to collect OUT1 and OUT2. Inputs A and B may be linearly polarized light at 45° representing L1 or linearly polarized light at –45° representing L0.

Input A is processed by a processing block 205(1). At processing block 205(1), A is split into two beams 210a, 210b using, for example, a beam splitter (BS) 210. Preferably, beams 210a, 210b are identical. Beam 210a may be processed by polarizer 215 having a polarization angle of ±45° to produce beam C. Beam 210b may be processed by an optical device 217 such as a mirror to produce a beam 210c, which preferably is identical to beam 210b. Beam 210c then may be processed by polarizer 220 at a polarization angle of –45° to produce beam E. Alternatively, a properly designed mask, such as a polarizing beam splitter or a birefringent polarizer, may be used to produce beams C, E.

If A=L1 (i.e., polarized at ±45°), beam C will have a polarization of ±45° representing L1, and beam E will be nonexistent (i.e., polarizer 220 will not produce an output beam). If A=L0 (i.e., polarized at –45°), beam C will be nonexistent (i.e., polarizer 215 will not produce an output beam), and beam E will have a polarization of –45° representing L0. Accordingly, either, but not both, beam C or beam E will exist at a time.

Beam C is further processed by a switch 100(1), which operates the same as switch 100 discussed above, where beams C and B are inputs to switch 100(1) and beam D is an output. Table 2 indicates the polarization state of beam D (and the intermediate beams) for the various combinations of A and B when input beams A and B are present at the inputs of AND gate 200.

TABLE 2

| A  | B  | C  | D  |
|----|----|----|----|
| L0 | L0 | NE | ↓  |
| L0 | L1 | NE | ↑  |
| L1 | L0 | L1 | L0 |
| L1 | L1 | L1 | L1 |

As shown in Table 2, when A=L0 and B=L0, beam C is nonexistent (NE). As discussed above with respect to switch 100, when the X1 is nonexistent (i.e., the logic state of C) and X2=L0 (i.e., the logic state of B), the output beam will equal the vertical component of X2. Since B=L0 (i.e., polarized at −45°), switch 100(1) will produce an output beam D equal to the vertical component of B, which is a beam polarized at −90° and represented by an downward pointing arrow, ↓.

Likewise, when A=L0 and B=L1, beam C is nonexistent and, thus, switch 100(1) will produce an output beam D equal to the vertical component of B, which is a beam polarized at 90° and represented by an upward pointing arrow, ↑.

When A=L1 and B=L0, C=L1 (i.e., polarized at 45°). As shown in Table 1 and discussed above, when the inputs to switch 100 are X1=L1 (i.e., the logic state of C) and X2=L0 (i.e., the logic state of B), the output beam is equal to L0. Thus, beam D is equal to L0.

When A=L1 and B=L1, C=L1 (i.e., polarized at 45°). As shown in Table 1 and discussed above, when the inputs to switch 100 are X1=L1 (i.e., the logic state of C) and X2=L1 (i.e., the logic stated of B), the output beam is equal to L1. Thus, beam D is equal to L1.

Beam D is further processed by processing block 205(2), which may be the same as and therefore may operate the same as processing block 205(1). Accordingly, processing block 205(2) may include a beam splitter 230, a polarizer 235 having a polarization angle of +45°, a mirror 237, and a polarizer 240 having a polarization angle of −45°. At processing block 205(2), beam D is split into two beams 230a, 230b using, for example, a beam splitter 230. Preferably, beams 230a, 230b are identical. Beam 230a may be processed by polarizer 235 having a polarization angle of +45° to produce beam X1'. Beam 230b may be processed by an optical device 237 such as a mirror to produce a beam 230c, which preferably is identical to beam 230b. Beam 230c then may be processed by polarizer 240 at a polarization angle of −45° to produce beam OUT2. Alternatively, a properly designed mask may be used to produce beams X1', OUT2.

If beam D=↓, beam X1' will have a polarization of +45° representing L1, and beam OUT2 will have a polarization of −45° representing L0.

Similarly, If beam D=↑, beam X1' will have a polarization of +45° representing L1, and beam OUT2 will have a polarization of −45° representing L0.

If beam D=L1 (i.e., polarized at +45°), beam X1' will have a polarization of +45° representing L1, and beam OUT2 will be nonexistent (i.e., polarizer 240 will not produce an output beam).

If beam D=L0 (i.e., polarized at −45°), beam X1' will be nonexistent (i.e., polarizer 235 will not produce an output beam), and beam OUT2 will have a polarization of −45° representing L0.

Beam X1' is further processed by switch 100(2), which operates the same as switch 100 discussed above, where beam X1' and X2' are inputs to switch 100(2) and F is an output. It is noted that beam E is processed by an attenuator 225 that changes the intensity but not the polarization angle of beam E. Attenuator 325 will be discussed in greater detail below, however, for the present discussion, it is noted that the polarization angle of beam E equals the polarization angle of X2'. As discussed above with respect to processing block 205(1), beam E (and therefore X2') is nonexistent when A=L1 (i.e., polarized at +45°).

Table 3 indicates the polarization state of beams X1', X2', and F for the various combinations of A and B when input beams A and B are present at the inputs of AND gate 200.

TABLE 3

| A  | B  | D  | X1' | X2' | F  |
|----|----|----|-----|-----|----|
| L0 | L0 | ↓  | L1  | L0  | L0 |
| L0 | L1 | ↑  | L1  | L0  | L0 |
| L1 | L0 | L0 | NE  | NE  | NE |
| L1 | L1 | L1 | L1  | NE  | →  |

As shown in Table 3, when A=L0 and B=L0, X1'=L1 and X2'=L0. As shown in Table 1 and discussed above, when the inputs to switch 100 are X1=L1 (i.e., the logic state of X1') and X2=L0 (i.e., the logic stated of E), the output beam is equal to L0. Thus, beam F is equal to L0.

When A=L0 and B=L1, X1'=L1 and X2'=L0. Thus, as discussed above, beam F is equal to L0.

When A=L1 and B=L0, both beams X1' and X2' are nonexistent (NE). Thus, beam F is nonexistent.

When A=L1 and B=L1, X1'=L1 and beam X2' is nonexistent. As discussed above with respect to switch 100, when the inputs to switch 100 are X1=L1 (i.e., the logic state of X1') and X2 is nonexistent (i.e., the logic state of X2'), the output beam will equal the horizontal component of X1. Thus, when X1 is either a logic 0 or 1, beam F is equal to a beam having a polarization of 0°, which is represent by a horizontal arrow, →.

Beam F is further processed by a polarizer 245 having a polarization angle of +45° to produce beam OUT1. As shown in Table 3, beam F may equal L0, may be nonexistent, or may be a beam having a polarization of 0° (i.e., →). When F=L0, OUT1 in nonexistent. When F is nonexistent, OUT1 is nonexistent. When F=→, OUT1=L1.

Table 4 indicates the polarization state of beams OUT1 and OUT2 (and the intermediate beams) for the various combinations of A and B when input beams A and B are present at the inputs of AND gate 200. As discussed above, the output of AND gate 200, OUT, is either OUT1 or OUT2, whichever signal is present and is obtained by, for example, using a beam splitter as a beam collector to collect OUT1 and OUT2. Table 4 also indicates the state of beam OUT for the various combinations of A and B. As shown in Table 4, AND gate 200 implements an AND logic operation, where A and B are inputs to the AND gate 200 and OUT is the output.

TABLE 4

| A  | B  | D  | X1' | X2' | F  | OUT1 | OUT2 | OUT |
|----|----|----|-----|-----|----|------|------|-----|
| L0 | L0 | ↓  | L1  | L0  | L0 | NE   | L0   | L0  |
| L0 | L1 | ↑  | L1  | L0  | L0 | NE   | L0   | L0  |
| L1 | L0 | L0 | NE  | NE  | NE | NE   | L0   | L0  |
| L1 | L1 | L1 | L1  | NE  | →  | L1   | NE   | L1  |

Also as shown by Table 4, beam X2' acts as a control beam such that if X2' is present, the input to switch 100(2), X1', is blocked and OUT1 is nonexistent; if X2' is nonexistent, X1' is passed to OUT1 (except in the case where X1' also is nonexistent).

Still further, Table 4 illustrates how processing block 205(2) converts a beam having a polarization of ±90° (i.e., ↓ or ↑), which does not represent any logic state in a system in which L1 and L0 are represented by linearly polarized light at 45° and −45°, respectively. More specifically, processing block 205(2) converts D=↓ or ↑ to beams X1' and OUT2 having a polarization that represent either L1 or L0. Switch 100(2) and polarizer 245 is used to cancel X1' if OUT2 exist to properly implement the AND operation.

Figure 3:
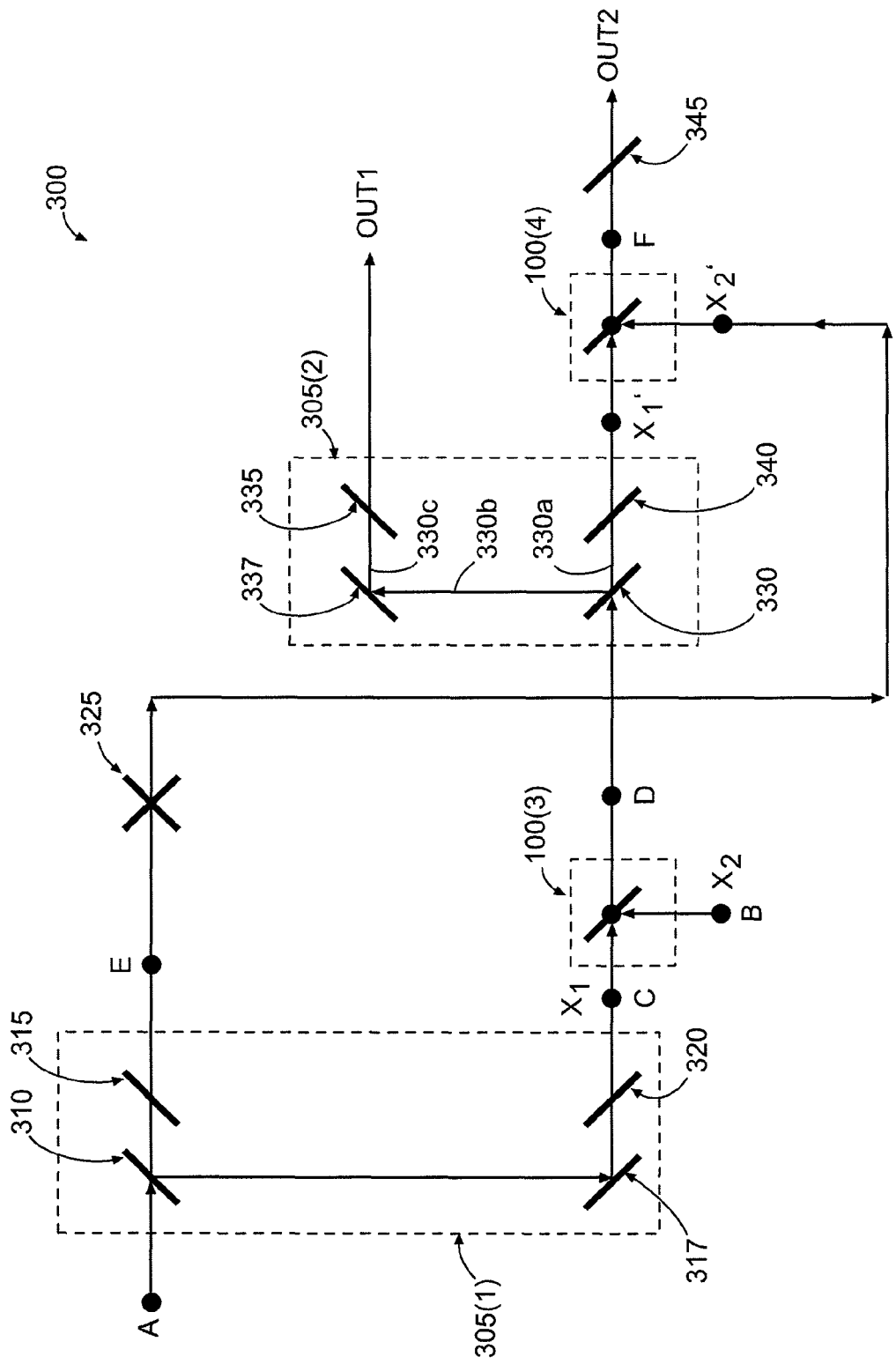
FIG. 3 illustrates an embodiment of an OR gate implementation utilizing an all optical passive polarization switch.

FIG. 3 illustrates an embodiment of an OR gate 300 based on the principles of the present invention. As with AND gate 200, optical beams A and B may be inputs to OR gate 300 and the output of OR gate 300 is either OUT1 or OUT2, whichever signal is present (i.e., the output is a beam that may be obtained by using a beam splitter as a beam collector to collect OUT1 and OUT2). Inputs A and B may be linearly polarized light at 45° representing L1 or linearly polarized light at −45° representing L0.

Input A is processed by a processing block 305(1). Processing block 305(1) may be the same as and therefore may operate the same as processing block 205(1). Accordingly, processing block 305(1) may include a beam splitter 310, a polarizer 315 having a polarization angle of +45, a mirror 317, and a polarizer 320 having a polarization angle of −45°. Thus, for the same reasons discussed above with respect to processing block 205(1), either, but not both, beam C or beam E of OR gate 300 will exist at a time.

Beam C is further processed by a switch 100(3), which operates the same as switch 100 discussed above, where beams C and B are inputs to switch 100(3) and beam D is an output. Table 5 indicates the polarization state of beam D (and the intermediate beams) for the various combinations of A and B when input beams A and B are present at the inputs of OR gate 300.

TABLE 5

| A | B | C | D |
|---|---|---|---|
| L0 | L0 | L0 | L0 |
| L0 | L1 | L0 | L1 |
| L1 | L0 | NE | ↓ |
| L1 | L1 | NE | ↑ |

Table 5 is derived in a similar manner as discussed above with respect to Table 2.

Beam D is further processed by processing block 305(2). Processing block 305(2) is similar to processing block 305(1) except that the polarizers (i.e., the polarizer having a polarization angle of +45° and the polarizer having a polarization angle of −45°) have been swapped. That is, processing block 305(2) may include a beam splitter 330, a polarizer 335 having a polarization angle of +45°, a mirror 337, and a polarizer 340 having a polarization angle of −45°. Accordingly, beam D may be split into two beams 330a, 330b using, for example, a beam splitter 330. Preferably, beams 330a, 330b are identical. Beam 330a may be processed by polarizer 340 having a polarization angle of −45° to produce beam X1'. Beam 330b may be processed by an optical device 337 to produce a beam 330c, which preferably is identical to beam 330b. Beam 330c then may be processed by polarizer 335 at a polarization angle of +45° to produce beam OUT1. Alternatively, a properly designed mask may be used to produce beams X1', OUT1.

If beam D=↓, beam X1' will have a polarization of −45° representing L0, and beam OUT1 will have a polarization of +45° representing L1.

Similarly, If beam D=↑, beam X1' will have a polarization of −45° representing L0, and beam OUT1 will have a polarization of +45° representing L1.

If beam D=L0, beam X1' will have a polarization of −45° representing L0, and beam OUT1 will be nonexistent (i.e., polarizer 335 will not produce an output beam).

If beam D=L1, beam X1' will be nonexistent (i.e., polarizer 340 will not produce an output beam), and beam OUT1 will have a polarization of +45° representing L1.

Beam X1' is further processed by a switch 100(4), which operates the same as switch 100 discussed above, where beam X1' and X2' are inputs to switch 100(4) and beam F is an output. It is noted that beam E is processed by an attenuator 325 that changes the intensity but not the polarization angle of beam E. Attenuator 325 will be discussed in greater detail below, however, for the present discussion, it is noted that the polarization angle of beam E equals the polarization angle of X2'. As discussed above with respect to processing block 305(1), beam E (and therefore X2') is nonexistent when A=L0 (i.e., polarized at −45°).

Table 6 indicates the polarization states of beams X1', E, and F for the various combinations of A and B when input beams A and B are present at the inputs of OR gate 300.

TABLE 6

| A | B | D | X1' | X2' | F |
|---|---|---|---|---|---|
| L0 | L0 | L0 | L0 | NE | → |
| L0 | L1 | L1 | NE | NE | NE |
| L1 | L0 | ↓ | L0 | L1 | L1 |
| L1 | L1 | ↑ | L0 | L1 | L1 |

Beam F is further processed by a polarizer 345 having a polarization angle of −45° to produce beam OUT2. As shown in Table 6, beam F may equal L1, may be nonexistent, or may be a beam having a polarization of 0° (i.e., →). When F=L1, OUT2 in nonexistent. When F is nonexistent, OUT2 is nonexistent. When F=→, OUT2=L0.

Table 7 indicates the polarization state of beams OUT1 and OUT2 (and the intermediate beams) for the various combinations of A and B when input beams A and B are present at the inputs of OR gate 300. As discussed above, the output of OR gate 300, OUT, is either OUT1 or OUT2, whichever signal is present and is obtained by, for example, using a beam splitter as a beam collector to collect OUT1 and OUT2. Table 7 also indicates the state of beam OUT for the various combinations of A and B. As shown in Table 7, OR gate 300 implements an OR logic operation, where A and B are inputs to the OR gate 300 and OUT is the output.

TABLE 7

| A | B | D | X1' | X2' | F | OUT1 | OUT2 | OUT |
|---|---|---|---|---|---|---|---|---|
| L0 | L0 | L0 | L0 | NE | → | NE | L0 | L0 |
| L0 | L1 | L1 | NE | NE | NE | L1 | NE | L1 |
| L1 | L0 | ↓ | L0 | L1 | L1 | L1 | NE | L1 |
| L1 | L1 | ↑ | L0 | L1 | L1 | L1 | NE | L1 |

Figure 4:
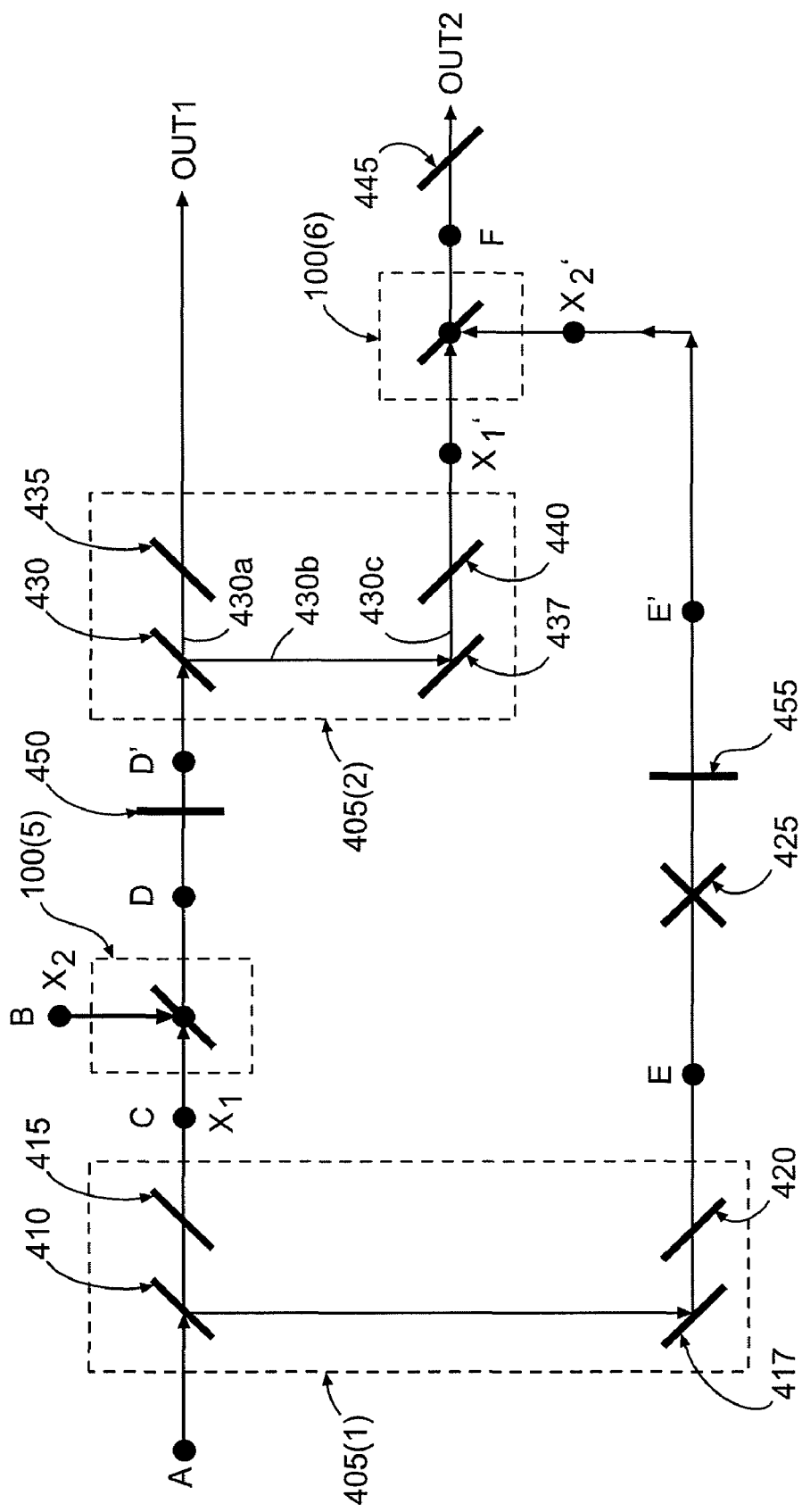
FIG. 4 illustrates an embodiment of a NAND gate implementation utilizing an all optical passive polarization switch.

A NAND gate can be obtained from the AND gate 200 discussed above by simply processing the output signal, OUT, of AND gate 200 with an 180° retarder (HWP). FIG. 4 illustrates an alternate embodiment of an NAND gate 400 based on the principles of the present invention. Optical beams A and B may be inputs to NAND gate 400 and the output of NAND gate 400 is either OUT1 or OUT2, whichever signal is present. As discussed above with respect to AND gate 200 and OR gate 300, the output to the logic gate is a beam that may be obtained by using a beam splitter as a beam collector to collect OUT1 and OUT2. Inputs A and B may be linearly polarized light at 45° representing L1 or linearly polarized light at −45° representing L0.

Input A is processed by a processing block 405(1). Processing block 405(1) may be the same as and therefore may operate the same as processing block 205(1). Accordingly, processing block 405(1) may include a beam splitter 410, a polarizer 415 having a polarization angle of +45°, a mirror 417, and a polarizer 420 having a polarization angle of −45°. Thus, for the same reasons discussed above with respect to processing block 205(1), either, but not both, beam C or beam E of NAND gate 400 will exist at a time.

Beam C is further processed by a switch 100(5), which operates the same as switch 100 discussed above, where beams C and B are inputs to switch 100(5) and beam D is an output. Table 8 indicates the polarization state of beam D (and the intermediate beams) for the various combinations of A and B when input beams A and B are present at the inputs of NAND gate 400.

TABLE 8

| A  | B  | C  | D  |
|----|----|----|----|
| L0 | L0 | NE | ↓  |
| L0 | L1 | NE | ↑  |
| L1 | L0 | L1 | L0 |
| L1 | L1 | L1 | L1 |

Beam D is further processed by retarder 450 to produce beam D' by introducing a 180° relative polarization angle to beam D.

Beam D' is processed by processing block 405(2), which may be the same as and therefore may operate the same as processing block 405(1). Accordingly, processing block 405(2) may include a beam splitter 430, a polarizer 435 having a polarization angle of +45°, a mirror 437, and a polarizer 440 having a polarization angle of −45°. At processing block 405(2), beam D' is split into two beams 430a, 430b using, for example, a beam splitter 430. Preferably, beams 430a, 430b are identical. Beam 430a may be processed by polarizer 435 having a polarization angle of +45° to produce beam OUT1. Beam 430b may be processed by an optical device 437 such as a mirror to produce a beam 430c, which preferably is identical to beam 430b. Beam 430c then may be processed by polarizer 440 at a polarization angle of −45° to produce beam X1'. Alternatively, a properly designed mask may be used to produce beams X1', OUT1.

If beam D=↓, D'=↑ and beam OUT1 will have a polarization of +45° representing L1, and beam X1' will have a polarization of −45° representing L0.

Similarly, If beam D=↑, D'=↓ and beam OUT1 will have a polarization of +45° representing L1, and beam X1' will have a polarization of −45° representing L0.

If beam D=L1, D'=L0 and beam OUT1 will be nonexistent (i.e., polarizer 435 will not produce an output beam) and beam X1' will have a polarization of −45° representing L0.

If beam D=L0, D'=L1 and beam OUT1 will have a polarization of +45° representing L1 and beam X1' will be nonexistent (i.e., polarizer 440 will not produce an output beam).

Beam X1' is further processed by a switch 100(6), which operates the same as switch 100 discussed above, where beams X1' and X2' are inputs to switch 100(6) and beam F is an output. Beam X2' is derived from beam E, which is processed by an attenuator 425 that changes the intensity but not the polarization angle of beam E. Attenuator 425 will be discussed in greater detail below. The resulting signal from attenuator 425 will have the same polarization angle as beam E and is processed by retarder 455 to produce beam E' (i.e., X2'). As discussed above with respect to processing block 205(1), beam E is nonexistent when A=L1. Accordingly, beam E', X2' will be nonexistent when A=L1.

Table 9 indicates the polarization state of beams X1', X2', and F for the various combinations of A and B when input beams A and B are present at the inputs of NAND gate 400.

TABLE 9

| A  | B  | D'  | X1' | X2' | F  |
|----|----|-----|-----|-----|-----|
| L0 | L0 | ↑   | L0  | L1  | L1 |
| L0 | L1 | ↓   | L0  | L1  | L1 |
| L1 | L0 | L1  | NE  | NE  | NE |
| L1 | L1 | L0  | L0  | NE  | →  |

Beam F is further processed by a polarizer 445 having a polarization angle of −45° to produce beam OUT2. As shown in Table 9, beam F may equal L1, may be nonexistent, or may be a beam having a polarization of 0° (i.e., →). When F=L1, OUT2 in nonexistent. When F is nonexistent, OUT2 is nonexistent. When F=→, OUT2=L0.

Table 10 indicates the polarization state of beams OUT1 and OUT2 (and the intermediate beams) for the various combinations of A and B when input beams A and B are present at the inputs of NAND gate 400. As discussed above, the output of NAND gate 400, OUT, is either OUT1 or OUT2, whichever signal is present and is obtained by, for example, using a beam splitter as a beam collector to collect OUT1 and OUT2. Table 10 also indicates the state of beam OUT for the various combinations of A and B. As shown in Table 10, NAND gate 400 implements a NAND logic operation, where A and B are inputs to the NAND gate 400 and OUT is the output.

TABLE 10

| A  | B  | D' | X1' | X2' | F  | OUT1 | OUT2 | OUT |
|----|----|-----|-----|-----|----|------|------|-----|
| L0 | L0 | ↑  | L0  | L1  | L1 | L1   | NE   | L1  |
| L0 | L1 | ↓  | L0  | L1  | L1 | L1   | NE   | L1  |
| L1 | L0 | L1 | NE  | NE  | NE | L1   | NE   | L1  |
| L1 | L1 | L0 | L0  | NE  | →  | NE   | L0   | L0  |

Figure 5:
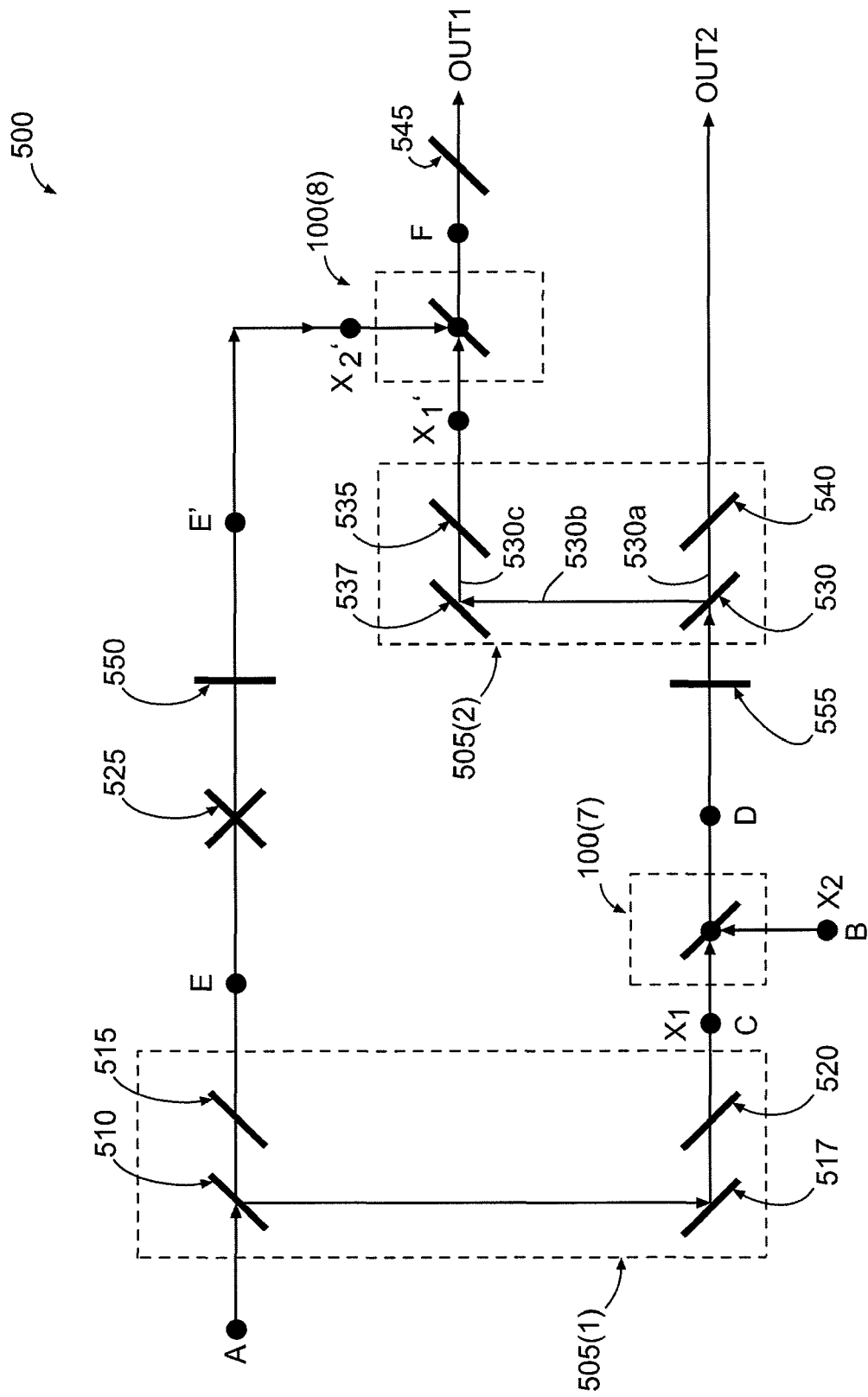
FIG. 5 illustrates an embodiment of a NOR gate implementation utilizing an all optical passive polarization switch.

FIG. 5 illustrates an embodiment of a NOR gate 500 based on the principles of the present invention. As with previous gates discussed, optical beams A and B may be inputs to NOR gate 500 and the output of NOR gate 500 is either OUT1 or OUT2, whichever signal is present. Inputs A and B may be linearly polarized light at 45° representing L1 or linearly polarized light at −45° representing L0.

Input A is processed by a processing block 505(1). Processing block 505(1) may be the same as and therefore may operate the same as processing block 205(1). Accordingly, processing block 505(1) may include a beam splitter 510, a polarizer 515 having a polarization angle of +45°, a mirror 517, and a polarizer 520 having a polarization angle of −45°. Thus, for the same reasons discussed above with respect to processing block 205(1), either, but not both, beam C or beam E of NOR gate 500 will exist at a time.

Beam C is further processed by a switch 100(7), which operates the same as switch 100 discussed above, where beams C and B are inputs to switch 100(7) and beam D is an output. Because processing block 505(1) and switch 100(7) are the same as processing block 305(1) and switch 100(3) of FIG. 3, Table 5 indicates the polarization state of beam D (and the intermediate beams) of NOR gate 500 for the various combinations of A and B when input beams A and B are present at the inputs of NOR gate 500.

Beam D is further processed by retarder 555 to produce beam D' by introducing a 180° relative polarization angle to beam D.

Beam D' is processed by processing block 505(2). Processing block 505(2) may be the same as and therefore may operate the same as processing block 305(2). Accordingly, processing block 505(2) may include a beam splitter 530, a polarizer 535 having a polarization angle of +45°, a mirror 537, and a polarizer 540 having a polarization angle of −45°. At processing block 505(2), beam D' may be split into two beams 530a, 530b using, for example, a beam splitter 530. Preferably, beams 530a, 530b are identical. Beam 530a may be processed by polarizer 540 having a polarization angle of −45° to produce beam OUT2. Beam 530b may be processed by an optical device 537 to produce a beam 530c, which preferably is identical to beam 530b. Beam 530c then may be processed by polarizer 535 at a polarization angle of +45° to produce beam X1'. Alternatively, a properly designed mask may be used to produce beams X1', OUT2.

If beam D=↓, D'=↑ and beam OUT2 will have a polarization of −45° representing L0, and beam X1' will have a polarization of +45° representing L1.

Similarly, If beam D=↑, D'=↓ and beam OUT2 will have a polarization of −45° representing L0, and beam X1' will have a polarization of +45° representing L1.

If beam D=L1, D'=L0 and beam OUT2 will have a polarization of −45° representing LO and beam X1' will be nonexistent (i.e., polarizer 535 will not produce an output beam).

If beam D=L0, D'=L1 and beam OUT2 will be nonexistent (i.e., polarizer 540 will not produce an output beam) and beam X1' will have a polarization of +45° representing L1.

Beam X1' is further processed by a switch 100(8), which operates the same as switch 100 discussed above, where beam X1' and X2' are inputs to switch 100(8) and beam F is an output. Beam X2' is derived from beam E, which is processed by an attenuator 525 that changes the intensity but not the polarization angle of beam E. Attenuator 525 will be discussed in greater detail below. The resulting signal from attenuator 525 will have the same polarization angle as beam E and is processed by retarder 550 to produce beam E' (i.e., X2'). As discussed above with respect to processing block 505(1), beam E (and therefore E', X2') is nonexistent when A=L0.

Table II indicates the polarization states of beams X1', X2', and F for the various combinations of A and B when input beams A and B are present at the inputs of NOR gate 500.

TABLE 11

| A | B | D' | X1' | X2' | F |
|---|---|----|-----|-----|---|
| L0 | L0 | L1 | L1 | NE | → |
| L0 | L1 | L0 | NE | NE | NE |
| L1 | L0 | ↑ | L1 | L0 | L0 |
| L1 | L1 | ↓ | L1 | L0 | L0 |

Beam F is further processed by a polarizer 545 having a polarization angle of +45° to produce beam OUT1. As shown in Table 11, beam F may equal L0, may be nonexistent, or may be a beam having a polarization of 0° (i.e., →). When F=L0, OUT1 in nonexistent. When F is nonexistent, OUT1 is nonexistent. When F=→, OUT1=L1.

Table 12 indicates the polarization state of beams OUT1 and OUT2 (and the intermediate beams) for the various combinations of A and B when input beams A and B are present at the inputs of NOR gate 500. As discussed above, the output of NOR gate 500, OUT, is either OUT1 or OUT2, whichever signal is present and is obtained by, for example, using a beam splitter as a beam collector to collect OUT1 and OUT2. Table 12 also indicates the state of beam OUT for the various combinations of A and B. As shown in Table 12, NOR gate 500 implements a NOR logic operation, where A and B are inputs to the NOR gate 500 and OUT is the output.

TABLE 12

| A | B | D' | X1' | X2' | F | OUT1 | OUT2 | OUT |
|---|---|----|-----|-----|---|------|------|-----|
| L0 | L0 | L1 | L1 | NE | → | L1 | NE | L1 |
| L0 | L1 | L0 | NE | NE | NE | NE | L0 | L0 |
| L1 | L0 | ↑ | L1 | L0 | L0 | NE | L0 | L0 |
| L1 | L1 | ↓ | L1 | L0 | L0 | NE | L0 | L0 |

Returning to FIG. 2, Table 13 indicates the intensity of the beams at various stages of AND gate 200. It is noted that attenuator 225 attenuates the intensity of beam E by ¼ to produce X2'. Attenuator 225 does not affect the polarization of beam E.

TABLE 13

| A | B | C | D | E | X1' | X2' | F | OUT1 | OUT2 | OUT |
|---|---|---|---|---|-----|-----|---|------|------|-----|
| L0 | L0 | 0 | $I_0/2$ | $I_0$ | $I_0/4$ | $I_0/4$ | $I_0/4$ | 0 | $I_0/4$ | $I_0/4$ |
| L0 | L1 | 0 | $I_0/2$ | $I_0$ | $I_0/4$ | $I_0/4$ | $I_0/4$ | 0 | $I_0/4$ | $I_0/4$ |
| L1 | L0 | $I_0$ | $I_0$ | 0 | 0 | 0 | 0 | 0 | $I_0$ | $I_0$ |
| L1 | L1 | $I_0$ | $I_0$ | 0 | $I_0$ | 0 | $I_0/2$ | $I_0/4$ | 0 | $I_0/4$ |

As shown in Table 13, the intensity of the output beam, OUT, is not constant for all of the various states of AND gate 200. This is also the case for OR gate 300, NAND gate 400, and NOR gate 500. It is noted that each of these gates also include an attenuator 325, 425, and 525, respectively, that attenuates the intensity of beam E by ¼ but does not affect the polarization of beam E. For cascading purposes, either the intensity of the output signal, OUT, must be equal to $I_o$ for all of the various states of an gate, or the intensity of the input signals to each gate must be equal to $I_o$.

Figure 6:
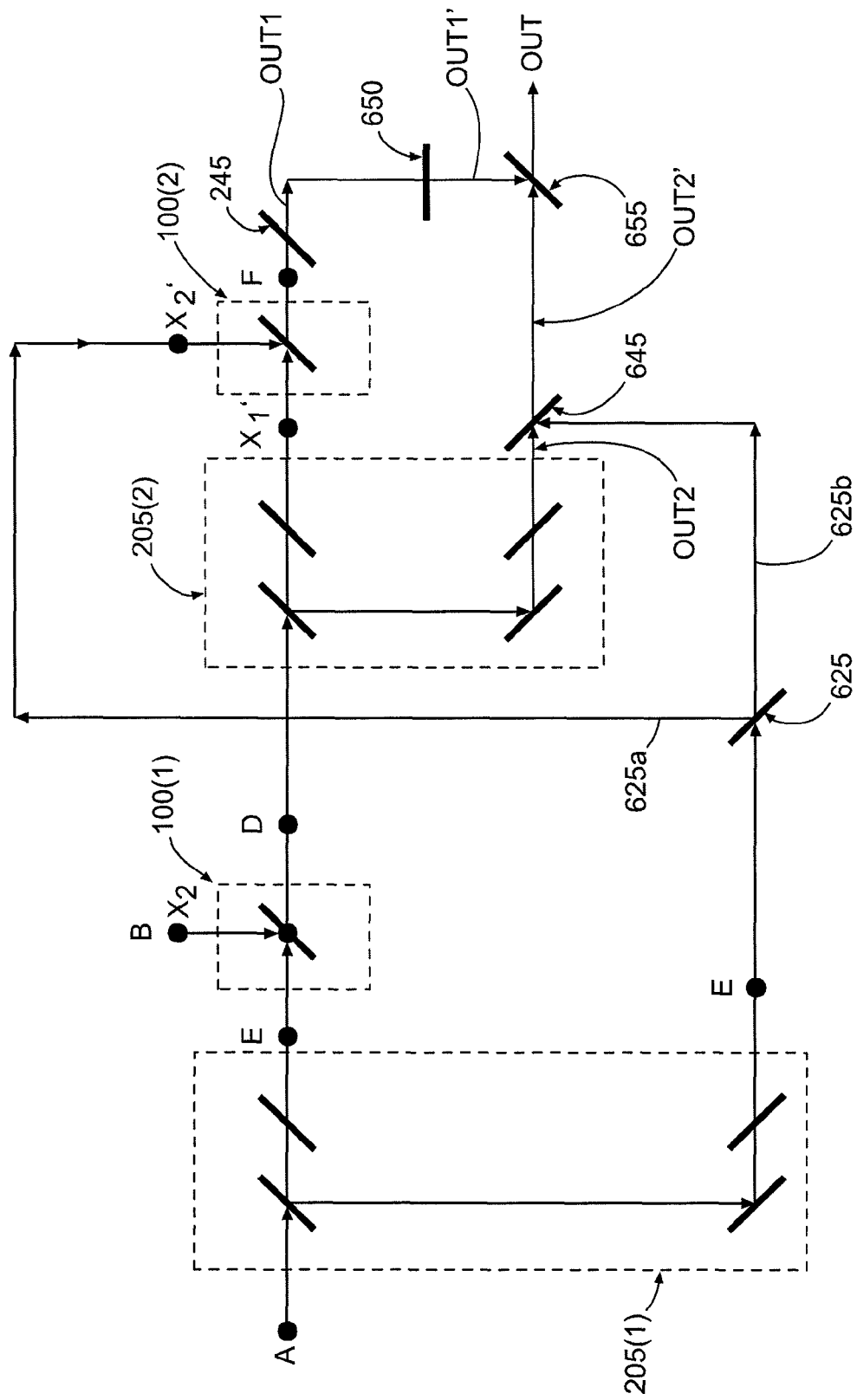
FIG. 6 illustrates another embodiment of an AND gate implementation utilizing an all optical passive polarization switch.

FIG. 6 illustrates an alternate embodiment of AND gate 200 that achieves an intensity of the output signal, OUT, equal to $I_o$ for all of the various states of AND gate 600. FIG. 6 is similar to FIG. 2, except that attenuator 225 has been replaced with a beam splitter 625 to produce two beams 625a (i.e. X2'), 625b; beam OUT1 is processed by an amplifier 650 to produce a beam OUT1'; beams OUT2 and 625b are combined by beam collector 645 to produce a beam OUT2'; and beams OUT1' and OUT2' are combined by a beam collector 655 to product an output beam OUT. Beam X2' has an intensity equal to ¼ the intensity of beam E and beam 625b has an intensity equal to ¾ the intensity of beam E. Table 14 indicates the intensity of the beams at various stages of AND gate 600.

TABLE 14

| A | B | C | D | E | X1' | X2' | F | OUT1' | OUT2' | OUT |
|---|---|---|---|---|-----|-----|---|-------|-------|-----|
| L0 | L0 | 0 | $I_0/2$ | $I_0$ | $I_0/4$ | $I_0/4$ | $I_0/4$ | 0 | $I_0$ | $I_0$ |
| L0 | L1 | 0 | $I_0/2$ | $I_0$ | $I_0/4$ | $I_0/4$ | $I_0/4$ | 0 | $I_0$ | $I_0$ |
| L1 | L0 | $I_0$ | $I_0$ | 0 | 0 | 0 | 0 | 0 | $I_0$ | $I_0$ |
| L1 | L1 | $I_0$ | $I_0$ | 0 | $I_0$ | 0 | $I_0/2$ | $I_0$ | 0 | $I_0$ |

As can be seen from Table 14, the output signal, OUT, equals $I_o$ for all of the various states of AND gate 600. This solution requires power input to AND gate 600, thus, AND gate 600 is not passive.

An alternate method of achieving an intensity of the output signal, OUT, equal to $I_o$ for all of the various states of AND gate 200 is to process the output beam, OUT, with a saturation amplifier to produce an output beam having an intensity of $I_o$. This solution also requires power and thus produces a gate that is not passive.

As discussed above, one method of cascading gates having varying output beam intensity levels is to ensure that the intensity of the input signals to each gate is equal to $I_o$. This may be achieved by processing the input beams of a gate (for example inputs A, B of AND gate 200) with saturation amplifiers, respectively, to produce beams having an intensity of $I_o$. Again, the use of amplifiers requires a power source.

A passive gate that achieves an intensity of the output signal, OUT, that is equal for all of the various states of AND gate 200 includes an attenuator added to AND gate 200 to process beam OUT2 to produce a beam having an intensity equal to ¼ the intensity of OUT2. As shown in FIG. 13, the output beam, OUT, is equal to $I_o/4$ for all the states of AND gate 200 except when A=L1 and B=L0. In this case, OUT2 is equal to $I_o$. An attenuator that reduces the intensity to $I_o/4$ will produce a gate in which the intensity of the output signal, OUT, is equal to $I_o/4$ for all of the various states of AND gate 200. An attenuator requires no power source to operate.

The above methods for adjusting the intensity of ouput or input beams of a gate may be utilized with any of the gates implemented according the principles of the present invention, as will be seen with respect to the NOR gate 500 when used to implement an SR latch 700 discussed below with respect to FIG. 7b.

The above described logic gates can be used as building block to design and implement more complicated gates. For instance, an all optical polarization digital processor may be implemented based on the principles of the present invention. The required memory element is achieved using a flip flop device which can be implemented using NOR gate 500 and the principles regarding cascading gates discussed above. FIG. 7a illustrates a SR latch 700, which includes two cross-coupled NOR gates 500'. FIG. 7b illustrates an all-optical polarization SR latch 700 using the NOR gate 500 of FIG. 5 with modifications similar to the modification discussed with respect to FIG. 6 to achieve an intensity of the output signals, Q, $\overline{Q}$, equal to $I_o$ for all of the various states of latch 600. It is also noted that a 2× amplifier is added in front of the BC at the output to provide a beam of intensity $I_o$ for both the feedback beam and output beam. An all-optical polarization S'R' latch similarly may be designed using two all-optical polarization NAND gates.

As described above and as will be appreciated by one skilled in the art, embodiments of the present invention may be configured as a method or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatus and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, principles of the invention can be used to design any logic gate of any type, with any truth table, and for any purpose, including gates that have yet to be designed. As another example, fiber may be used to implements the gates according to the principles of the present invention. In such a case, no mirrors are needed, and the 180° retarder R may be realized by rotating the fiber 90°.

Therefore, it is to be understood that the inventions are not to be limited to the specific embodiments disclosed and that modifications and other embodiments are intended to be included within the scope of the appended claims. Furthermore, it is understood that in the practical implementation of optical devices error may occur that results in errors. For example, the polarizers may not be ideal and there may be loss in the desired polarization and there may not be perfect absorption of the undesired polarizations. As another example, beams 210a, 210b, and 210c of FIG. 2 may not be identical. As another example, beams C, E, OUT1, or OUT2 may not be completely eliminated when required. However, it is understood that some margin of error is tolerable or may be corrected with additional device to operate the devices discloses as intended.

Although specific terms are employed herein, they are used in a generic and descriptive sense only and not for purposes of limitation.

That which is claimed:

1. A method of implementing a passive all optical polarization switch having as its input a first input polarized beam and a second input polarized beam, wherein a ratio of the amplitudes of two perpendicular polarization components of the first input polarized beam is one or nearly one; wherein a ratio of the amplitudes of two perpendicular polarization components of the second input polarized beam is one or nearly one; wherein the first input polarized beam and the second input polarized beam are in phase in the time domain; and wherein the intensity of the first input polarized beam and the intensity of the second input polarized beam are equal or nearly equal, the method comprising:
  receiving a first input polarized beam, wherein the polarization angle of the first input polarized beam equals or nearly equals 45 degrees or −45 degrees; and
  producing an output polarized beam based on the polarization angle of the first input polarized beam and, if present, the polarization angle of a second input polarized beam, wherein, if present, the polarization angle of the second input polarized beam equals or nearly equals 45 degrees or −45 degrees;
  wherein, when the second input polarized beam is present, the polarization angle of the output polarized beam equals or nearly equals the polarization angle of the first input polarized beam and, when the second input polarized beam is not present, the polarization angle of the output polarized beam either equals or nearly equals 90 degrees when the polarization angle of the first input polarized beam equals or nearly equals 45 degrees or equals or nearly equals −90 degrees when the polarization angle of the first input polarized beam equals or nearly equals −45 degrees.

* * * * *